United States Patent [19]
Withgott et al.

[11] Patent Number: 5,748,805
[45] Date of Patent: May 5, 1998

[54] METHOD AND APPARATUS FOR SUPPLEMENTING SIGNIFICANT PORTIONS OF A DOCUMENT SELECTED WITHOUT DOCUMENT IMAGE DECODING WITH RETRIEVED INFORMATION

[75] Inventors: M. Margaret Withgott, Los Altos, Calif.; William Newman, Cambridge, England; Steven C. Bagley, Palo Alto, Calif.; Daniel P. Huttenlocher, Ithaca, N.Y.; Ronald M. Kaplan, Palo Alto, Calif.; Todd A. Cass, Cambridge, Mass.; Per-Kristian Halvorsen, Los Altos, Calif.; John Seely Brown, San Francisco, Calif.; Martin Kay, Menlo Park, Calif.

[73] Assignee: Xerox Corporation, Stamford, Conn.

[21] Appl. No.: 272,452

[22] Filed: Jul. 11, 1994

Related U.S. Application Data

[63] Continuation of Ser. No. 795,419, Nov. 19, 1991, abandoned.

[51] Int. Cl.$^6$ ............................................. G06K 9/03
[52] U.S. Cl. ................................... 382/306; 707/512
[58] Field of Search ............................ 382/173, 308, 382/305, 317, 312, 162–165, 309–311, 306, 180, 175; 364/518, 419; 395/104, 146, 147; 707/512

[56] References Cited

U.S. PATENT DOCUMENTS

| | | | |
|---|---|---|---|
| 4,475,239 | 10/1984 | Van Raamsponk | 382/309 |
| 4,589,144 | 5/1986 | Namba | 382/175 |
| 4,594,732 | 6/1986 | Tsuji | 382/9 |
| 4,748,678 | 5/1988 | Takeda et al. | 382/306 |
| 4,847,912 | 7/1989 | Tanaka et al. | 382/9 |
| 4,965,763 | 10/1990 | Zamora | 364/900 |
| 4,972,349 | 11/1990 | Kleinberger | 364/900 |
| 4,985,863 | 1/1991 | Fujisawa et al. | 364/900 |
| 4,985,930 | 1/1991 | Takeda et al. | 382/56 |
| 4,994,987 | 2/1991 | Baldwin | 364/518 |
| 4,996,707 | 2/1991 | O'Malley et al. | 379/100 |
| 5,010,581 | 4/1991 | Kanno | 382/56 |
| 5,048,099 | 9/1991 | Lee | 382/282 |

(List continued on next page.)

FOREIGN PATENT DOCUMENTS

| | | |
|---|---|---|
| 0 364 179 | 4/1990 | European Pat. Off. . |
| 0 364 180 | 4/1990 | European Pat. Off. . |
| 0 398 185 | 11/1990 | European Pat. Off. . |
| 62-154845 | 7/1987 | Japan . |
| 4-77965 | 3/1992 | Japan . |

OTHER PUBLICATIONS

Dan S. Bloomberg, "Multiresolution Morphological Approach to Document Image Analysis"; First International Conference on Document Analysis and Recognition ICDAR 91; 30 Sep. –2 Oct. 1991; St. Malo, France; pp. 963–971.

"Blind readers can use machine to recognize all fonts"; COMPUTER, vol. 12, No. 2, 1979, pp. 97–98.

"A Business Intelligence System" by H.P. Luhn, IBM Journal, Oct. 1958.

"Introduction to Modern Information Retrieval" by Salton and McGill, Chapter 2, pp. 24–51, McGrawl-Hill, Inc. (1983).

Primary Examiner—Yon J. Couso
Attorney, Agent, or Firm—Oliff & Berridge, PLC

[57] ABSTRACT

A method and apparatus for applying morphological image criteria that identify image units in an undecoded document image having significant information content, and for retrieving related data that supplements the document either from elsewhere within the document or a source external to the document. The retrieved data can result from character code recognition or template matching of the identified significant image units, or the retrieved data can result directly from an analysis of the morphological image characteristics of the identified significant image units. A reading machine can allow a user to browse and select documents or segments thereof, and to obtain interactive retrieval of documents and supplemental data.

31 Claims, 5 Drawing Sheets

U.S. PATENT DOCUMENTS

| | | | |
|---|---|---|---|
| 5,048,109 | 9/1991 | Bloomberg et al. | 382/50 |
| 5,050,218 | 9/1991 | Ikeda et al. | 382/1 |
| 5,058,189 | 10/1991 | Kanno | 382/282 |
| 5,077,668 | 12/1991 | Doi | 364/419 |
| 5,175,684 | 12/1992 | Chong | 364/419 |
| 5,195,032 | 3/1993 | Mastui et al. | 364/419 |
| 5,222,160 | 6/1993 | Sakai et al. | 382/57 |
| 5,495,581 | 2/1996 | Tsai | 395/154 |

1.3.1.1 Les différentes catégories d'éditeurs interactifs

Les éditeurs de texte interactifs peuvent être classés en quatre catégories: les éditeurs orientés par la syntaxe, les éditeurs orientés par la structure, les éditeurs de texte ou processeurs de texte, et les éditeurs/formatteurs à composants graphiques.

Les premiers correspondant aux outils qui se développent le plus souvent autour de la programmation. Ils sont en general liés à un langage de programmation et à ses caractéristiques. Ils permettent au progammeur d'accroître sa productivité en l'aidant à présenter ses programmes correctement et en opérant des contrôles syntaxiques qui réduisent le temps de mise au point. Au delà de leurs fonctionnalités de traitement de texte, ils intègrent en fait certaines fonctions dévolues habituellemnt au compilateur ou à l'interpréteur.

Les seconds cherchent à exploiter la structure naturelle des documents. Ainsi une lettre est en sous parties modélisable sous la forme d'un arbre contenant: l'en-tête, la date, le nom et l'adresse du destinataire, le corps de la lettre, des paragraphes, des sous-paragraphes, une formule de politesse, une signature,

1.3.1.1 Les différentes catégories d'éditeurs interactifs

― 11

Les éditeurs de texte interactifs p<u>euven</u>t être classés en quatre catégories: les éditeurs orientés par la syntaxe, les éditeurs orientés par la structure, les éditeurs de texte ou processeurs de texte, et les éditeurs/formatteurs à co<u>mposants</u> graphiques.
― 11 can components

Les premiers correspondant aux <u>outils</u> qui se développent le plus so<u>uvent</u> autour de la programmation. Ils sont en general l<u>iés</u> à un langage de programmation et à ses caractéristiques. Ils permettent au progammeur d'<u>accroître</u> sa productivité en l'aidant à présenter ses programmes correctement et en opérant des contrôles syntaxiques qui r<u>éduisent</u> le temps de <u>mise</u> au point. Au d<u>elà</u> de leurs fonctionnalités de traitement de texte, ils intègrent en fait certaines fonctions d<u>évolues</u> habituellemnt au co<u>mpilateu</u>r ou à l'interpréteur.
―― 11
\― 11 tools
often    connected grow reduce    put
beyond
delegated
compiler

Les seconds ch<u>erchen</u>t à exploiter la structure naturelle des documents. A<u>insi</u> une lettre est en <u>sous</u> parties modélisable sous la forme d'un <u>arbre</u> contenant: l'<u>en-tête</u>, la date, le nom et l'adresse du d<u>estinataire</u>, le c<u>orps</u> de la lettre, des paragraphes, des sous-paragraphes, une formule de p<u>olitesse</u>, une signature,
\― 11 seek
Thus    under/sub-
tree    heading
destination    body
politeness

FIG. 4

METHOD AND APPARATUS FOR SUPPLEMENTING SIGNIFICANT PORTIONS OF A DOCUMENT SELECTED WITHOUT DOCUMENT IMAGE DECODING WITH RETRIEVED INFORMATION

This is a Continuation of application Ser. No. 07/795,419 filed Nov. 19, 1991, now abandoned.

BACKGROUND OF THE INVENTION

1. Cross-References to Related Applications

The following concurrently filed and related U.S. Patent Applications are hereby cross referenced and incorporated by reference in their entirety. "Method and Apparatus for Determining Boundaries of Words in Text" to Huttenlocher et al., U.S. patent application Ser. No. 07/794,392 now U.S. Pat. No. 5,321,770.

"Detecting Function Words Without Converting A Document to Character Codes" to Bloomberg et al., U.S. patent application Ser. No. 07/794,190 now abandoned.

"A Method of Deriving Wordshapes for Subsequent Comparison" to Huttenlocher et al., U.S. patent application Ser. No. 07/794,391 now abandoned.

"Method and Apparatus for Determining the Frequency of Words in a Document without Document Image Decoding" to Cass et al., U.S. patent application Ser. No. 07/796,173 now U.S. Pat. No. 5,208,969.

"Optical Word Recognition By Examination of Word Shape" to Huttenlocher et al., U.S. patent application Ser. No. 07/796,119 now abandoned.

"Method for Comparing Word Shapes" to Huttenlocher et al., U.S. patent application Ser. No. 07/795,169 now abandoned.

"A Method and Apparatus for Image Hand Markup Detection", U.S. patent application Ser. No. 07/794,275 now U.S. Pat. No. 5,201,011.

2. Field of the Invention

This invention relates to improvements in methods and apparatus for electronic document processing, and more particularly to improvements in methods and apparatus for automatically selecting semantically significant words, characters, images, or image segments in a document image without first decoding the document or otherwise understanding the information in the document, and augmenting the document with additional retrieved information relating to the selected words, characters, images, or image segments.

3. References and Background

One objective of computer based electronic document processing is to facilitate the user's access to and understanding of the information contained in a document or corpus of documents. However, in many cases, such as with a document in a language or form (e.g., non-Braille text for a blind user) which is foreign to the user, the user needs additional information or translation of the document in order to obtain any understanding of the document. In other cases, even after a user reaches a level of understanding about a document or group of documents, the user often desires to obtain supplemental information with which to enhance the user's understanding. However, locating semantically significant portions of a document, or among a collection of documents, for example, and evaluating the relative significance of such portions can be a very arduous and time-consuming task. The problem of selecting the most significant portions of documents and retrieving supplemental information related thereto is particularly difficult when dealing directly with bit mapped document images rather than with character code representations (such as ASCII for text images). In the past, perfectly recognizable scanned text has been treated as being interchangeable with electronically stored character code files, rather than as a special problem domain. However, in contrast to ASCII text files, which permit users to perform operations such as Boolean algebraic key word searches to locate text of interest, text information that is scanned without decoding is difficult to retrieve, without exhaustive viewing of each document, or without hand-crafting summaries of the documents for search purposes. Of course, document viewing or creation of document summaries requires extensive human effort.

Examples of retrieval techniques that rely upon locating useful terms in a document can be found in Salton and McGill, *Introduction To Modern Information Retrieval*, McGraw-Hill, Inc., 1983. Thus, techniques exist for computing key word matches, locating the most frequent noun phrases in a text, composing stop-lists of words which are not likely to be of interest to a user of an information retrieval system, and so on. Such techniques generally assume noise-free (perfectly recognizable) text.

4. References

U.S. Pat. No. 4,972,349 to Kleinberger describes a computerized information retrieval system and method formed of a textbase of texts of variable length and content. The texts are selected from the textbase on the basis of Boolean logic searches among key words associated with the texts. When a group is retrieved from such a search, the system automatically segregates the texts based on the presence or absence of a criteria-key keyword selected to segregate the texts into sub-groups. The same criteria key analysis can then be applied recursively to the subgroups. The resulting subgroups are then displayed to the user in a hierarchical display to illustrate the relationships among the texts. A string comparison routine is also described to search for similar keywords.

U.S. Pat. No. 4,985,863 to Fujisawa et al. describes a document storage and retrieval system and a method of document retrieval that stores a portion of characters for outputting and also stores the document in the form of an image for retrieving. A retrieval request for a text is made using a proper number of the text or a special symbol. The document image can then be retrieved and stored or decoded to character codes for outputting. Character recognition is performed to recognize a retrieval key of a document before retrieval, although the actual retrieval or transfer of the document does not require complete character recognition.

U.S. Pat. No. 5,010,581 to Kanno describes a data processing apparatus for retrieving abstract and original image data. The abstract image is an abbreviated form of the original image. The apparatus includes input means for inputting an original image; first memory means for temporarily storing the original image input by the input means; drafting means for drafting an abstract image of the original image; second memory means for storing the original and abstract images; and retrieval means for retrieving the abstract image based on retrieval data corresponding to both the original and abstract image. The second memory means stores the abstract image as a first page of the original image.

U.S. Pat. No. 4,996,707 to O'Malley et al. describes a computer system that includes a capability to receive and store graphic images from remote facsimile machines. The system includes software that can convert graphic images of textual material into an ASCII coded file so that either keywords or the converted text may be converted to speech, giving the addressee-user the ability to review incoming facsimiles from a remote telephone. The system includes a relay capability, the capability to print on command and to originate facsimiles either from text files or scanned papers.

SUMMARY OF THE INVENTION

Accordingly, it is an object of the invention to provide an improved method and apparatus for electronic document processing wherein supplemental data is retrieved for association with the electronic document which is relevant to significant portions of the document selected without decoding of the document.

It is another object of the invention to provide a method and apparatus of the type described that may perform retrieval operations based on morphological (structural) image characteristics of the document image to select the portions of the document on which the supplemental data retrieval is based, either with or without the supporting use of optical character recognition techniques to retrieve the supplemental data.

It is another object of the invention to provide a method and apparatus of the type described that may be used to provide supplemental information relating to a source document to be used in reading machines for the blind.

It is another object of the invention to provide a method and apparatus of the type described that may be used to provide translations for selected words in a source document.

In accordance with one aspect of the invention, a method for processing an undecoded document image is presented. According to the method, the document image is segmented into image units having information content without decoding of the document image. The significant image units on which the document supplementation is to be based are then identified, based solely on an evaluation of at least one morphological (structural) image characteristic of selected image units, or of hand-drawn document markings associated therewith. Supplemental data related to the identified significant image units are then retrieved, either with or without decoding of the identified significant image units in dependence on the form of the supplemental data.

The morphological image characteristics used to identify significant image units include image unit shape dimensions, typeface, font, location in the document image and frequency of image unit occurrence. In one embodiment, the significant image units are identified according to hand-drawn graphical markings placed on the document by the user adjacent word units of interest to the user, such as encircling or underscoring.

The retrieval method may be used to retrieve, for example, foreign language translation data corresponding to the selected image units, or Braille versions of the selected image units for print out. The supplemental data may also take the form of a different mode of display, such as speech synthesized verbal output of the selected image units.

In accordance with another aspect of the invention, an apparatus for retrieving data to supplement a document is presented. The apparatus includes a scanner for scanning the document image, and means for segmenting the document image into image units. Means are provided for classifying selected image units as significant image units, and means are provided for retrieving supplemental data related to the significant image units for utilization with the document. The apparatus may include a programmed digital computer to provide the means for segmenting the document image,
means for classifying significant image units, and the means for retrieving supplemental data.

These and other objects, features and advantages of the invention will be apparent to those skilled in the art from the following detailed description, when read in conjunction with the accompanying drawings and appended claims.

BRIEF DESCRIPTION OF THE DRAWINGS

A preferred embodiment of the invention is illustrated in the accompanying drawings, in which:

FIG. 3 is an example of a text document on which selected terms have been underlined for identification and association with supplemental information, in accordance with the method embodiment of FIG. 1B.

FIG. 4 is an example of the document of FIG. 3 on which supplemental information has been associated in accordance with the method of the invention.

DETAILED DESCRIPTION OF THE PREFERRED EMBODIMENTS

Figure 1A:
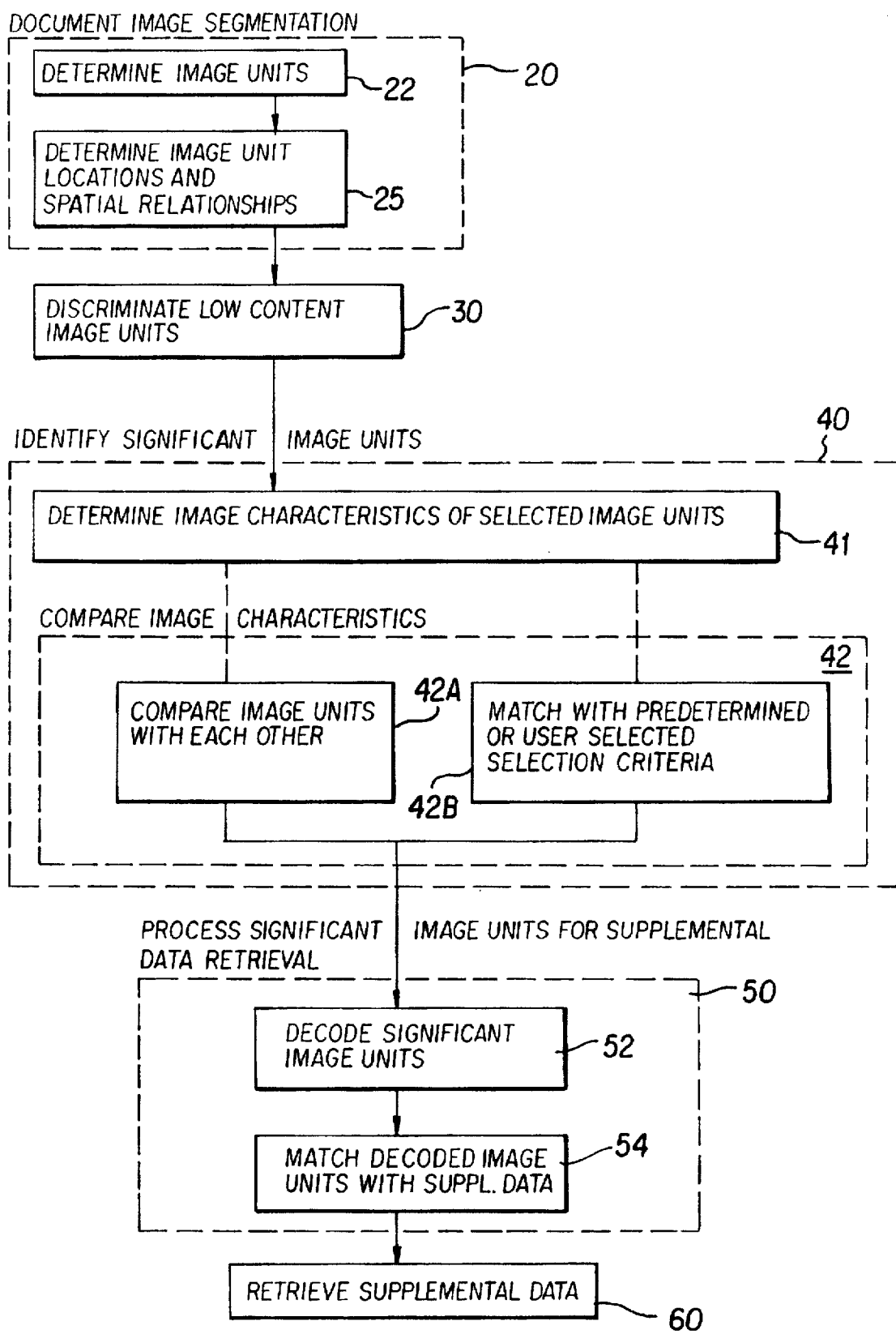
FIG. 1A is a flow chart of a first embodiment of a method of the invention.

In contrast to prior techniques, such as those described above, the invention is based upon the recognition that scanned image files and character code files exhibit important differences for image processing, especially in data retrieval. The method of a preferred embodiment of the invention capitalizes on the visual properties of text contained in paper documents, such as the presence or frequency of linguistic terms (such as words of importance like "important", "significant", "crucial", or the like) used by the author of the text to draw attention to a particular phrase or region of the text; font and type face variations used to emphasize significant words, formatting conventions, and so on. Two preferred embodiments of the method of the invention are illustrated in the flow charts of FIGS. 1A and 1B, and an apparatus for performing both methods is shown in FIG. 2. For the sake of clarity, the invention will be described with reference to the processing of a single document. However, it will be appreciated that the invention is applicable to the processing of a corpus of documents containing a plurality of documents.

The invention provides a method and apparatus for retrieving data to supplement the data or text in, for example, a scanned document. However, the invention is not limited to systems utilizing document scanning. Rather, other systems such as a bitmap workstation (i.e., a workstation with a bitmap display) or a system using both bitmapping and scanning would work equally well for the implementation of the methods and apparatus described herein.

The supplementing data may be retrieved from a wide number of sources, for example, from internal data in another portion or page of the source document, or from external data, such as an on-line data base. The retrieved data can be presented in any number of ways. For example, it can be presented as marginal notes on the source document, i.e., the document containing material to be supplemented, adjacent the source document portion(s) to which it pertains; printed as footnotes on the source document; printed on separate documents or in special formats (e.g., Braille); presented in a different form of display, such as a video display or synthesized voice output; or in some other appropriate manner.

Still more particularly, in accordance with one aspect of the invention (FIG. 1B), selected portions of the source document can be denoted by a user by hand-marking the source document. Due to the varied applications for the invention, the marking may take various forms. For example, a user may underline or encircle or otherwise highlight selected words to be supplemented. An example of such selection is illustrated in FIG. 3, in which selected words in a text 7 have been marked by underlining 11.

The selection, on the other hand, may take a more automatic form (FIG. 1A), for example, in which significant portions of the source document are targeted and automatically identified by a general purpose digital computer or the like according to one or more morphological image characteristics which are predetermined or selected by the user.

With reference first to FIG. 2, the method is performed on an electronic image of an original document 5 (e.g., a bitmap image or a scanned image), which may include lines of text 7, titles, drawings, FIG. 8, or the like, contained in one or more sheets or pages of paper 10 or other tangible form. The electronic document image to be processed is created in any conventional manner, for example, by an input means, such as an optical scanner 12 and sensor 13 as shown, a document copier machine scanner, a Braille reading machine scanner, a bitmap workstation, an electronic beam scanner or the like. Such means are well known in the art, and thus are not described in detail herein. An output derived from, for example, a scanner sensor 13 is digitized to produce undecoded bit mapped image data representing the document image for each page of the document, which data is stored, for example, in a memory 15 of a special or general purpose digital computer 16. The output from the computer 16 is delivered to an output device 17, such as, for example, a memory or other form of storage unit; an output display 17A as shown, which may be, for instance, a CRT display; a printer device 17B as shown, which may be incorporated in a document copier machine or a Braille or standard form printer; a facsimile machine, speech synthesizer or the like.

The more automatic embodiment of the method of the invention, in which the image characteristics of selected image units are evaluated, will now be described with reference to FIG. 1A. The first phase of the image processing technique of the invention involves a low level document image analysis in which the document image for each page is segmented into undecoded information containing image units (step 20) using conventional image analysis techniques; or, in the case of text documents, preferably using the bounding box method described in concurrently filed U.S. patent application Ser. No. 07/794,392 filed concurrently herewith by Huttenlocher and Hopcroft, and entitled "Method and Apparatus for Determining Boundaries of Words in Text".

Another method for finding word boxes is to close the image with a horizontal SE that joins characters but not words, followed by an operation that labels the bounding boxes of the connected image components (which in this case are words). The process can be greatly accelerated by using 1 or more threshold reductions (with threshold value 1), that have the effect both of reducing the image and of closing the spacing between the characters. The threshold reduction(s) are typically followed by a closing with a small horizontal SE. The connected component labeling operation is also done at the reduced scale, and the results are scaled up to full size. The disadvantage of operating at reduced scale is that the word bounding boxes are only approximate; however, for many applications the accuracy is sufficient. The described method works fairly well for arbitrary text fonts, but in extreme cases, such as large fixed width fonts that have large inter-character separation or small variable width fonts that have small inter-word separation, mistakes can occur. The most robust method chooses a SE for closing based on a measurement of specific image characteristics. This requires adding the following two steps:

(1) Order the image components in the original or reduced (but not closed) image in line order, left to right and top to bottom.

(2) Build a histogram of the horizontal inter-component spacing. This histogram should naturally divide into the small inter-character spacing and the larger inter-word spacings. Then use the valley between these peaks to determine the size of SE to use for closing the image to merge characters but not join words.

Once the bounding boxes or word boxes are determined, the locations of and spatial relationships between the image units on a page can be determined (step 25). For example, an English language document image can be segmented into word image units based on the relative difference in spacing between characters within a word and the spacing between words. Sentence and paragraph boundaries can be similarly ascertained. Additional region segmentation image analysis can be performed to generate a physical document structure description that divides page images into labelled regions corresponding to auxiliary document elements like figures, tables, footnotes and the like. Figure regions can be distinguished from text regions based on the relative lack of image units arranged in a line within the region, for example. Using this segmentation, knowledge of how the documents being processed are arranged (e.g., left-to-right, top-to-bottom), and, optionally, other inputted information such as document style, a "reading order" sequence for word images can also be generated. The term "image unit" is thus used herein to denote an identifiable segment of an image such as a number, character, glyph, symbol, word, phrase or other unit that can be reliably extracted. Advantageously, for purposes of document review and evaluation, the document image is segmented into sets of signs, symbols or other elements, such as words, which together form a single unit of understanding. Such single units of understanding are characterized in an image as being separated by a spacing greater than that which separates the elements forming a unit.

Advantageously, a discrimination step 30 is next performed to identify the image units which have insufficient information content to be useful in evaluating the subject matter content of the document being processed. One preferred method for use with text documents is to use the morphological function or stop word detection techniques disclosed in the copending U.S. patent application Ser. No. 07/794,190 filed concurrently herewith by Bloomberg et al., and entitled "Detecting Function Words Without Converting A Document to Character Codes".

Next, in step 40, selected image units, e.g., the image units not discriminated in step 30, are evaluated, without decoding the selected image units or reference to decoded image data, based on an evaluation of predetermined or selected image characteristics of the image units. The evaluation entails a determination (step 41) of the morphological image characteristics and a comparison (step 42) of the determined image characteristics for each image unit either with the determined morphological image characteristics of the other image units or with predetermined morphological image characteristics or morphological image characteristics selected by the user.

One preferred method for defining the image unit image characteristics to be evaluated is to use the word shape derivation techniques disclosed in the copending U.S. patent application Ser. No. 07/794,391 filed concurrently herewith by D. Huttenlocher and M. Hopcroft, and entitled "A Method for Deriving Wordshapes for Subsequent Comparison". As described in the aforesaid application, at least one, one-dimensional signal characterizing the shape of the word unit is derived; or an image function is derived defining a boundary enclosing the word unit, and the image function is augmented so that an edge function representing edges of the character string detected within the boundary is defined over its entire domain by a single independent variable within the closed boundary, without individually detecting and/or identifying the character or characters making up the word unit.

The determined morphological characteristic(s), e.g., the derived image unit shape representations, of each selected image unit are compared, as noted above (step 42), either with the determined morphological image characteristic(s) or derived image unit shape representations of the other selected image units (step 42A), or with predetermined/user-selected image characteristics to locate specific types of image units (step 42B). The determined morphological image characteristics of the selected image units are advantageously compared with each other for the purpose of identifying equivalence classes of image units such that each equivalence class contains most or all of the instances of a given image unit in the document, and the relative frequencies with which image units occur in a document can be determined, as is set forth more fully in the copending U.S. patent application Ser. No. 07/795,173 filed concurrently herewith by Cass et al. now abandoned, and entitled "Method and Apparatus for Determining the Frequency of Words in a Document with Document Image Decoding". Image units can then be classified or identified as significant according to the frequency of their occurrence, as well as other characteristics of the image units, such as their length. For example, it has been recognized that for business communications in English, a useful combination of selection criteria is to select the medium frequency word units.

It will be appreciated that the specification of the image characteristics for titles, headings, captions, linguistic criteria or other significance indicating visual features of a document image can be predetermined and selected by the user to determine the selection criteria defining a "significant" image unit. Comparing the image characteristics of the selected image units of the document image for matches with the image characteristics associated with the selection criteria permits the significant image units to be readily identified without any document decoding.

Any of a number of different methods of comparison can be used. One technique that can be used, for example, is by correlating the raster images of the extracted image units using decision networks, such technique being described for characters in a Research Report entitled "Unsupervised Construction of Decision networks for Pattern Classification" by Casey et al., IBM Research Report, 1984, said Research Report being incorporated by reference herein.

Preferred techniques that can be used to identify equivalence classes of word units are the word shape comparison techniques disclosed in U.S. patent application Ser. Nos. 07/796,119 and 07/795,169 now abandoned, filed concurrently herewith by Huttenlocher and Hopcroft, and by Huttenlocher, Hopcroft and Wayner, respectively, and entitled, respectively, "Optical Word Recognition By Examination of Word Shape," and "Method for Comparing Word Shapes".

Depending on the particular application, and the relative importance of processing speed versus accuracy, for example, evaluations of different degrees of precision can be performed. For example, useful evaluations can be based on length, width and/or other measurement dimensions of the image unit (or derived image unit shape representation, e.g., the largest figure in a document image); the location of the image unit in the document (including any selected figure or paragraph of a document image, e.g., headings, initial figures, one or more paragraphs or figures), font, typeface, cross-section (a cross-section being a sequence of pixels of similar state in an image unit); the number of ascenders; the number of descenders; the average pixel density; the length of a top line contour, including peaks and troughs; the length of a base contour, including peaks and troughs; the location of image units with respect to neighboring image units; vertical position; horizontal inter-image unit spacing; and combinations of such classifiers.

Figure 1B:
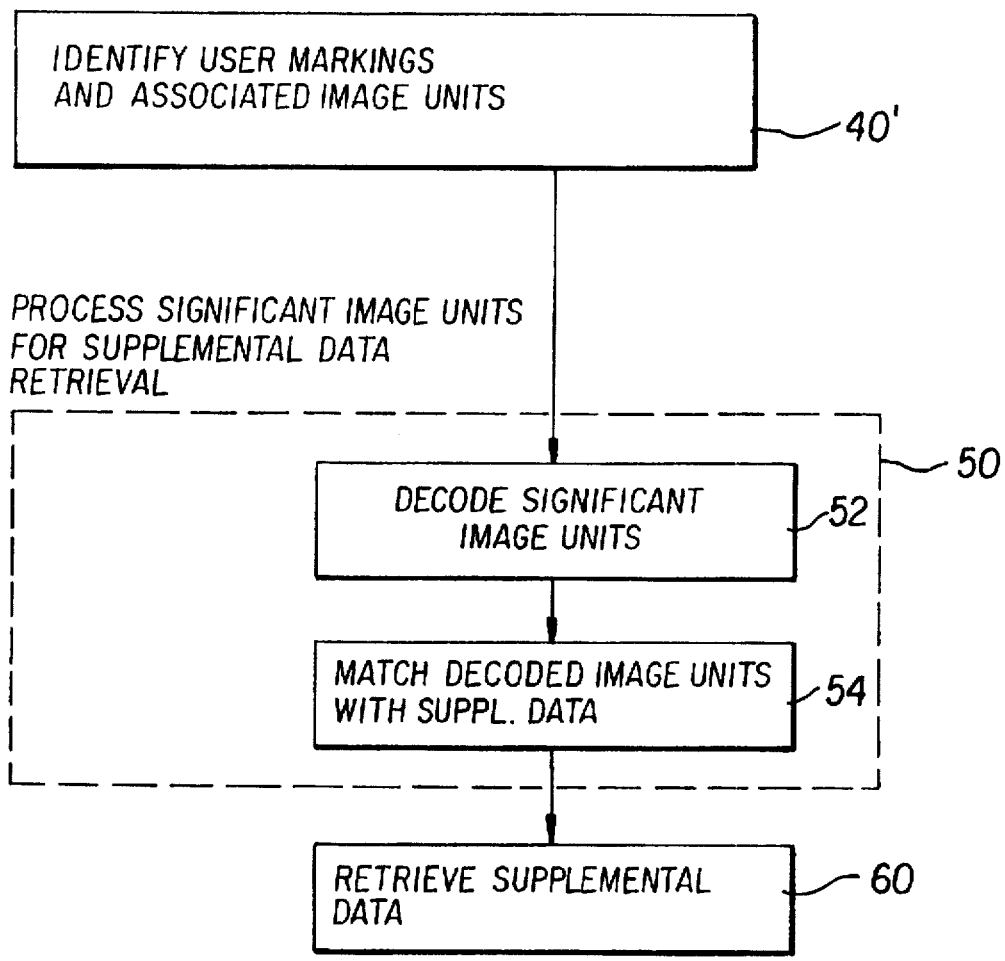
FIG. 1B is a flow chart of a second embodiment of a method of the invention.
Figure 2:
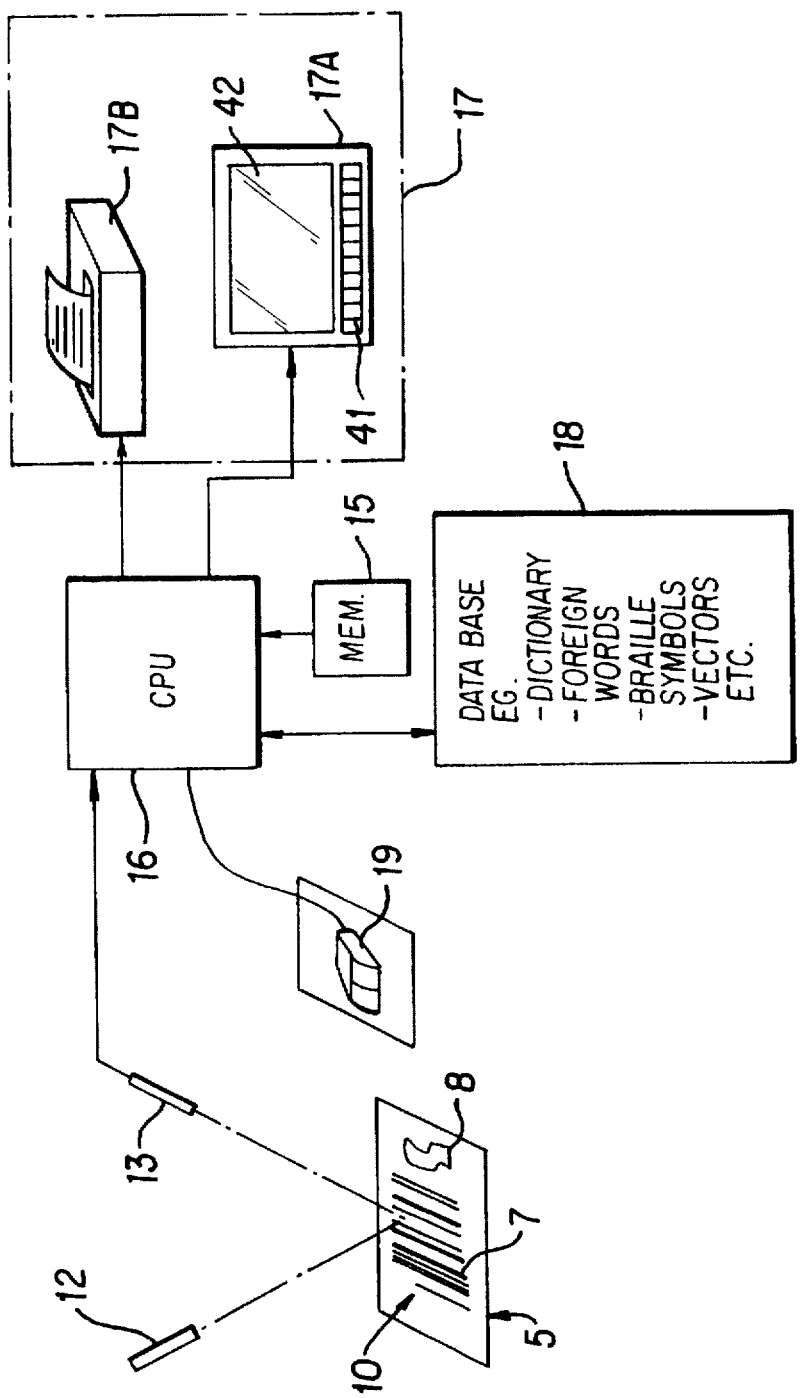
FIG. 2 is a block diagram of an apparatus according to the invention for carrying out the method embodiments of either FIG. 1A or 1B.

Referring to FIG. 1B, the embodiment of the method of the invention in which significant image units are selected based on user hand-drawn markings placed on the document does not require an initial document image segmentation step. Instead, the morphological method for identifying hand-drawn graphical markings disclosed in copending U.S. application Ser. No. 07/794,275 , filed concurrently herewith, by Bloomberg, and entitled "A Method and Apparatus for Image Hand Markup Detection", now U.S. Pat. No. 5,201,011 is preferably utilized (step 40') to identify the regions of the document image containing the user markings. This method also permits the image units associated with the user markings to be identified.

In instances in which multiple page documents are processed, each page is processed and the data held in the memory 15 (see FIG. 1), as described above. The entirety of the data can then be processed.

Through use of equipment such as illustrated in FIG. 2, the identified word units 11 are morphologically detected; that is, significant morphological (structural) image characteristics inherent in the image form of the word units are detected. The non-content based image recognition aspect of the invention allows image processing of documents to provide integral information about the documents without first converting text in the document to character codes. Data retrieval can be then provided to automatically and directly access supplemental information associated with the detected word units.

A salient feature provided by the method of the invention is the initial processing and identification of significant word units being accomplished without an accompanying requirement that the content of the word units be decoded. More particularly, to this stage in the process, the actual content of the word units is not required to be specifically determined. Thus, for example, in such applications as copier machines or electronic printers that can print or reproduce images directly from one document to another without regard to ASCII or other encoding/decoding requirements, image units can be identified and processed using one or more morphological image characteristics or properties of the image units. The image units of unknown content can then be further optically or electronically processed. One of the advantages that results from the ability to perform such image unit processing without having to decode the image unit contents at this stage of the process is that the overall speed of image handling and manipulation can be significantly increased.

The second phase of the document analysis according to both method embodiments of the invention involves further processing (step 50) of the identified image units in connection with the supplemental data retrieval. The further processing can be accomplished using a number of different techniques, depending upon the particular application. For example, word units 11 (FIG. 3) that have been identified from the scanned document may be decoded (step 52) by optical character recognition techniques, which techniques are well known in the art and thus are not described herein in detail. The decoded word units are then matched (step 54) with associated supplemental data in a conventional manner. For instance, in one embodiment, the supplemental data is contained in a data base 18 (see FIG. 2) that may contain specific data pertaining to the specific decoded word units. Data base 18 may be, for example, a dictionary containing definitions of the decoded words, translations of foreign words, or cross-references to related documents. Alternatively, the supplemental data may be vectors or keys to particular data such as synthesized speech data, memory locations, etc.

The supplemental data is then retrieved and outputted (step 60) to an appropriate output device. In the embodiment exemplified in FIGS. 3 and 4, for example, the supplemental data is translated words 45 corresponding to the words underlined by the user. In this case, the translated words are outputted by adding them to the document image in a conventional manner so that they appear in the margin adjacent the line containing the words underlined by the user when the document image is printed or displayed, as shown in FIG. 4.

Thus, employing the method and apparatus of the invention, a "translating copier" machine, for example, may be constructed to assist a user in understanding documents written in foreign languages. Depending on the degree to which the user is familiar with the foreign language, the user may either mark difficult or unknown words in a printed copy of the document or portion thereof for translation supplementation, or enter through an appropriate user interface a request that all significant words in the document or document portion be automatically selected in accordance with either predetermined or user-selected significance criteria. The translating photocopier then either scans the marked-up copy of the document and identifies the marked word units in accordance with the above described FIG. 1B method embodiment, or evaluates the image characteristics of selected word units in the scanned document image pursuant to the user's request to identify significant word units in accordance with the above described FIG. 1A embodiment. The copier then retrieves the relevant translation supplemental data as described above, and prints a fresh copy of the document or document portion with translations of the underlined words in the margins opposite the underlined words, as shown in FIG. 4.

Another application of the document supplementation techniques of the invention is in reading machines for the blind. One embodiment supports the designation by a user of key words, for example, on a key word list to designate likely points of interest in a document. Using the user designated key words, occurrences of the word can be found in the document of interest by OCR techniques or the like, and regions of text forward and behind the key word can be retrieved and processed using the techniques described above. Or, significant key words can be automatically determined using the morphological recognition techniques described above. The words thus identified as significant words or word units can then be decoded using optical character recognition techniques, for example, for retrieval of supplemental data which permits, for example, Braille versions of the significant words to be printed using a plastic-based ink printer associated with the reading machine. Alternatively, speech synthesized output devices can be employed to produce a voice output representation of the significant words as the supplemental data.

Once a document has been supplemented, the user may wish to return to the original source to have printed or hear a full text rendition. This may be achieved in a number of ways. One method is for a synthesizer or printer to provide source information, for example, "on top of page 2 is an article entitled ..." The user would then return to the point of interest.

Two classes of apparatus extend this capability through providing the possibility of user interaction while the supplemental data is being communicated. One type of apparatus is a simple index marker. This can be, for instance, a hand held device with a button that the user depresses whenever he or she hears a title of interest, or, for instance, an N-way motion detector in a mouse 19 (FIG. 2) for registering a greater variety of commands. The reading machine records such marks of interest and returns to the original article after the supplemental data is communicated.

Another type of apparatus makes use of the technology of touch-sensitive screens. Such an apparatus operates by requiring the user to lay down a Braille summarization sheet 41 on a horizontal display. The user then touches the region of interest on the screen 42 in order to trigger either a full printout or synthesized reading. The user would then indicate to the monitor when a new page was to be processed.

It will be appreciated that the method of the invention reduces the amount of material presented to the user for evaluation, and thus is capable of circumventing many problems inherent in the use of current reading technology for the blind and others, such as the problems associated with efficient browsing of a document corpus, using synthesized speech, and the problems created by the bulk and expense of producing Braille paper copies, and the time and effort required to read such copies.

The method of the invention has been described above to perform document retrieval using conventional character recognition techniques, such as OCR, in conjunction with morphological identification techniques. It will be appreciated, however, that direct retrieval using only image characteristic word unit recognition techniques may be performed in the case of supplemental data which is also stored as bit mapped image data compatible with the image data of the source document to be supplemented.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for electronically processing an electronic document image, comprising:
   segmenting the document image into word units without decoding the document image, each word unit corresponding to a word in said document image;

identifying significant ones of said word units in accordance with at least one selected morphological image characteristic of said word units without determining their content other than said at least one selected morphological image characteristic; and retrieving supplemental data related to the identified significant word units.

2. The method of claim 1 wherein said step of identifying significant word units includes a step of classifying said word units according to frequency of occurrence.

3. The method of claim 1 wherein said step of identifying significant word units includes a step of classifying said word units according to location within the document image.

4. The method of claim 1 wherein said at least one selected morphological image characteristic includes image characteristics defining word units having predetermined linguistic criteria.

5. The method of claim 1 wherein said at least one selected morphological image characteristic includes at least one of a word unit shape dimension, font, typeface, number of ascender elements, number of descender elements, pixel density, pixel cross-sectional characteristic, the location of word units with respect to neighboring word units, vertical position, horizontal inter-image unit spacing, and contour characteristic of said word units.

6. The method of claim 1 wherein said step of identifying significant word units comprises identifying word units having an associated hand-drawn marking created by a user.

7. The method of claim 1 wherein said step of retrieving supplemental data comprises retrieving foreign language data corresponding to said identified significant word units.

8. The method of claim 1 wherein said step of retrieving supplemental data comprises retrieving data from within the document.

9. The method of claim 1 wherein said step of retrieving supplemental data comprises retrieving data external to the document.

10. The method of claim 1 further comprising modifying the document image with retrieved data to provide a document annotation.

11. The method of claim 10 wherein the document annotation is in the form of marginal notes which are located in a margin of said modified document image.

12. The method of claim 1 wherein said step of retrieving supplemental data retrieves Braille versions of the identified significant word units.

13. The method of claim 12 further comprising outputting said retrieved Braille versions of the identified significant word units in printed form.

14. The method of claim 1 wherein said step of retrieving supplemental data for the document comprises retrieving synthesized speech versions of the identified significant word units.

15. A method for translating a selected word in a text document, comprising:

marking the selected word in the document text with a hand-drawn graphical notation;

scanning the text document to produce an undecoded scanned document image;

segmenting the document image into image segments without decoding of the document image;

evaluating the morphological image characteristics of the scanned document image to identify said graphical notation;

identifying the image unit associated with said identified graphical notation;

retrieving translation data related to said identified image unit; and incorporating said retrieved translation data in said scanned document image.

16. The method of claim 15 wherein said retrieving step includes decoding the identified image unit and matching the decoded image unit with decoded data entries in a dictionary database.

17. A method for electronically processing an undecoded document image containing word text, comprising:

segmenting the document image into word image units without decoding the document image, each word image unit corresponding to a word in said document image;

evaluating selected word image units according to at least one morphological image characteristic of the selected word image units without determining their content other than said at least one morphological image characteristic to identify significant word image units;

retrieving supplemental data related to the identified significant word image units; and outputting said retrieved supplemental data.

18. An apparatus for retrieving data to supplement a document, comprising:

means for inputting the document to produce an undecoded document image;

means for segmenting the document image into word units having undecoded information content without decoding the document image, each word unit corresponding to a word in said document image;

means for evaluating selected word units according to at least one morphological image characteristic of said selected word units, without determining their content other than said at least one morphological image characteristic, to identify significant word units;

means for retrieving supplemental data related to the identified significant word units; and an output device which utilizes the retrieved supplemental data.

19. The apparatus of claim 18 wherein said means for segmenting the document image, said means for identifying significant word units, and said means for retrieving supplemental data comprise a programmed digital computer.

20. The apparatus of claim 18, wherein the means for inputting the document comprises a bitmap workstation.

21. The apparatus of claim 20 wherein said retrieved supplemental data is translation data.

22. The method of claim 1, wherein said step of retrieving supplemental data comprises retrieving data from an online database.

23. The apparatus of claim 22 wherein said output device is a Braille printer for producing document copies in Braille format.

24. The apparatus of claim 22 wherein said output device is a speech synthesizer for producing synthesized speech output corresponding to said identified significant word units.

25. An apparatus for retrieving data to supplement a document, comprising:

a copier machine having a scanner for inputting the document to produce an undecoded document image;

means for segmenting the document image into word units having undecoded information content without decoding the document image, each word unit corresponding to a word in said document image;

means for evaluating selected word units according to at least one morphological image characteristic of said selected word units, without determining their content other than said at least one morphological image characteristic, to identify significant word units;

means for retrieving supplemental data related to the identified significant word units;

said copier machine including an output device for producing printed documents; and means for incorporating said retrieved supplemental data into the document image for printing as part of a printed document by said output device.

26. An apparatus for retrieving data to supplement a document, comprising:

a Braille reading machine including a means for inputting the document to produce an undecoded document image;

means for segmenting the document image into word units having undecoded information content without decoding the document image, each word unit corresponding to a word in said document image;

means for evaluating selected word units according to at least one morphological image characteristic of said selected word units, without determining their content other than said at least one morphological image characteristic, to identify significant word units;

means for retrieving supplemental data related to the identified significant word units; and said Braille reading machine including an output device which utilizes the retrieved supplemental data to produce an output intelligible to a blind user.

27. The method of claim 1, further comprising printing said retrieved supplemental data with a copier machine.

28. The method of claim 27, wherein, prior to performing said segmenting step, said electronic document image is input to said copier machine.

29. The method of claim 28, wherein said electronic document image is input with a scanner of said copier machine.

30. The method of claim 15, wherein said text document is scanned using a scanner of a copier machine.

31. The method of claim 30, further comprising printing the scanned document image incorporating said retrieved translation data with a printing device of said copier machine.

* * * * *